(12) United States Patent
Razzell et al.

(10) Patent No.: US 6,765,328 B2
(45) Date of Patent: Jul. 20, 2004

(54) SHAFT BEARINGS

(75) Inventors: Anthony G Razzell, Derby (GB); Ian C D Care, Derby (GB); John J A Cullen, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 10/278,891

(22) Filed: Oct. 24, 2002

(65) Prior Publication Data

US 2003/0127927 A1 Jul. 10, 2003

(30) Foreign Application Priority Data

Nov. 10, 2001 (GB) .............................. 0127087

(51) Int. Cl.$^7$ .............................................. H02K 7/09
(52) U.S. Cl. ...................... 310/90.5; 310/89; 310/266
(58) Field of Search .................. 310/90.5, 89, 75 D, 310/90

(56) References Cited

U.S. PATENT DOCUMENTS

| | | | |
|---|---|---|---|
| 4,128,280 A | * | 12/1978 | Purtschert ................... 384/107 |
| 5,216,308 A | | 6/1993 | Meeks |
| 5,453,650 A | * | 9/1995 | Hashimoto et al. ......... 310/268 |
| 5,455,472 A | | 10/1995 | Weiss |
| 5,942,825 A | * | 8/1999 | Lee ............................ 310/90.5 |

\* cited by examiner

Primary Examiner—Thanh Lam
(74) Attorney, Agent, or Firm—W. Warren Taltavull; Manelli, Denison & Selter PLLC

(57) ABSTRACT

An inner rotatable shaft 16 is located within an outer rotatable shaft 18. A stator 52 is provided around the shaft 18. The shaft 18 has a circumferential ring of regions 54a, 54b alternately of relatively high and relatively low magnetic permeability. Flux is therefore transmitted between the stator 52 and the shaft 16 through the regions 54, preferentially through the high permeability regions 54a. Commutation of the stator windings, preferably in synchrony with the speed of rotation of the shaft 18, allows the stator 52 and shaft 16 to interact in the form of an active magnetic bearing. The affect of the presence of the shaft 18 on this interaction is significantly reduced or eliminated.

12 Claims, 3 Drawing Sheets

SHAFT BEARINGS

FIELD OF THE INVENTION

The present invention relates to shaft bearings and in particular, to bearing arrangements for use with a shaft arrangement having an inner rotatable shaft located within an outer shaft which is hollow and rotatable.

BACKGROUND OF THE INVENTION

Rotating shafts generally require to be supported by a bearing arrangement during use, in order to control the alignment of the shaft. It is common practice to support a rotating shaft by means of ball or roller bearings. This necessitates the provision of a lubrication system, with attendant problems of size, weight and reliability, together with capital and maintenance costs. In order to obviate the need for a lubrication system, it has been proposed to support a single shaft by means of active magnetic bearings, which make use of magnetic interaction between the shaft, which acts as a rotor, and a stator which surrounds the shaft. The stator has pole pieces which carry energising windings so that the poles may be energised by passing electric current through the coils to create magnetic fields. The interaction of the magnetic fields between the stator and the rotor can be controlled to cause the rotor to levitate within the stator, so that the alignment of the rotor can be controlled without the need for mechanical bearings and lubrication.

SUMMARY OF THE INVENTION

The present invention provides a shaft arrangement having an inner rotatable shaft located within an outer shaft which is hollow and rotatable, there being a bearing arrangement for controlling the alignment of the inner shaft, the bearing arrangement having an electrical stator means outside the outer shaft and operable, in use, to generate magnetic flux which extends through the outer shaft to interact with the inner shaft to control the alignment of the inner shaft, wherein the outer shaft has a circumferential ring of regions alternately of relatively high and relatively low magnetic permeability, the ring being located between the stator means and the inner shaft so that flux is transmitted between the stator means and inner shaft through the ring region and is transmitted preferentially through the high permeability regions.

The stator means may include a ring of pole pieces and energising means operable to energise the pole pieces to create a magnetic field, the energising means being operable to commutate the magnetic field as the outer shaft rotates. Preferably the commutation causes the magnetic field to rotate at substantially the same rate as the outer shaft, whereby flux through the high permeability regions is substantially maintained as the outer shaft rotates. The energising means is preferably operable to produce a commutating waveform for energising the pole pieces in commutated manner, and is further operable to superimpose a control waveform on the commutating waveform, the control waveform serving to create a variable force on the inner shaft, to control the alignment of the inner shaft.

Preferably the stator means and the high permeability regions cooperate to form flux paths which pass substantially radially from the stator means to the inner shaft along radii which are circumferentially spaced around the shaft, and pass substantially circumferentially around the inner shaft, between the two radial positions. The alignment of the region boundaries is preferably skewed relative to the axis of the inner shaft.

Alternatively, the stator means and high permeability regions may cooperate to form flux paths which pass substantially radially from the stator means to the inner shaft along radii which are spaced axially along the shaft, and pass substantially axially along the inner shaft, between the two radial positions.

Preferably the ring of regions is created by forming a ring of slots in the material of the outer shaft, and locating inserts in the slots, the material of the inserts and the material of the shaft being of different permeability.

The stator means and ring may be arranged to allow a transverse force to be applied to the inner shaft, or to allow an axial force to be applied to the inner shaft.

The invention also provides a gas turbine engine having a shaft arrangement according to any of the foregoing definitions. Preferably, at least the inner rotatable shaft is a load transmitting shaft interconnecting a fan or compressor and a turbine assembly of the engine.

BRIEF DESCRIPTION OF THE DRAWINGS

Examples of the present invention will now be described in more detail, by way of example only, and with reference to the accompanying drawings, in which.

DETAILED DESCRIPTION OF THE INVENTION

Figure 1:
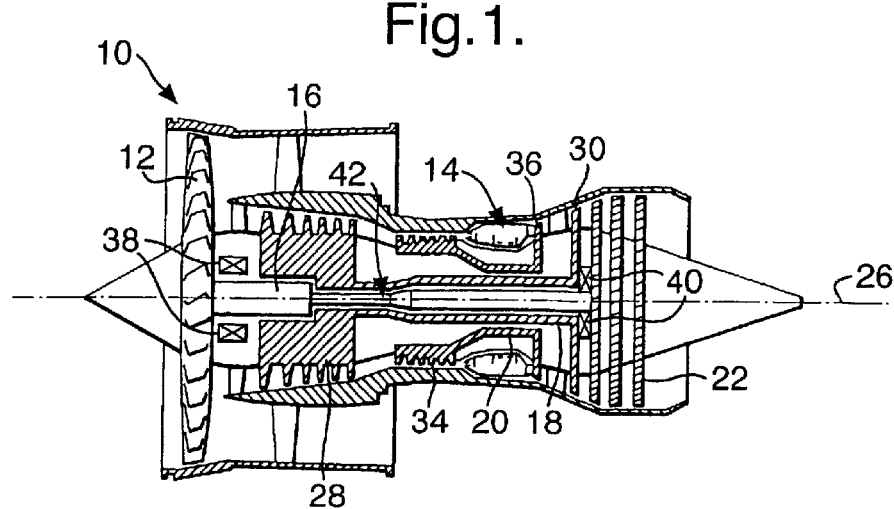
FIG. 1 is a diagrammatic section at a plane containing the central axis of a triple-spool gas turbine engine, representing the working environment for a shaft arrangement according to the present invention.

Turning to the drawings, FIG. 1 shows a conventional gas turbine engine 10 of the triple spool, front fan type, with a high bypass ratio. The engine provides an environment in which a shaft arrangement according to the present invention can be used.

The engine 10 comprises a front fan assembly 12 and a core engine 14. The engine 10 has three relatively rotatable shafts, which are a low pressure shaft 16, an intermediate pressure shaft 18 and a high pressure shaft 20. The low pressure shaft 16 is a load transmitting shaft which interconnects the fan 12 with a low pressure turbine assembly 22, located at the downstream end of the core engine 14. The shaft 16 is rotatable about the axis 26 of the engine. The intermediate pressure shaft 18 is a hollow load transmitting shaft concentrically disposed around the shaft 16 and interconnecting an intermediate pressure compressor 28 and an intermediate pressure turbine rotor assembly 30. The high pressure shaft 20 is similarly a hollow load transmitting shaft concentric with the shafts 16 and 18 and interconnecting a multi-stage axial flow compressor 34 and a turbine rotor assembly 36.

All three shafts 16, 18, 20 rotate while the engine is in operation. Bearings are provided at various locations to support the shafts. Some of these locations are indicated schematically in FIG. 1. For example, a bearing 38 is provided for the shaft 16 at one end, near the fan assembly 12. The other end of the shaft 16 is supported near the turbine 22 by a second bearing 40. In a typical practical engine, the length of the shaft 16, the speed of rotation and the torque applied to the shaft during operation, may create undesirable problems arising from the shaft dynamics, such as a tendency for the shaft to "whirl" at a critical frequency representing the relational frequency of the engine components. "Whirling" is the tendency for a shaft to undergo violent transverse oscillations along its length so that midway between the bearings 38, 40, the shaft may be significantly out of alignment and oscillating with unacceptably high amplitude.

The critical frequency at which whirling is likely to can be increased by providing an additional bearing, part way along the shaft 16. A position between the intermediate pressure compressor 28 and the high pressure compressor 34 may be convenient in relation to other structures of the engine, and represents a position which is very approximately half way along the shaft 16, so that the critical frequency for whirling will be approximately doubled. This is typically sufficient to take the critical frequency well above the highest operational frequency.

A third bearing at this position is indicated schematically at 42 in FIG. 1. As can readily be seen, the shaft 16 is within the shaft 18 at this position. Consequently, it has previously been proposed to provide an intershaft bearing acting between the shafts 16 and 18 and including inner and outer rolling element bearings, which bear on the shafts 16, 18 respectively. These structures require lubrication, which is difficult to provide within the confines of the shaft 18. Simply replacing the mechanical bearing at 42 with an active magnetic bearing housed within the shaft 18 would be difficult to implement because the stator would not be fixed, but would rotate with the shaft 18. The stator would also require an electrical supply for energising the poles.

Figure 2:
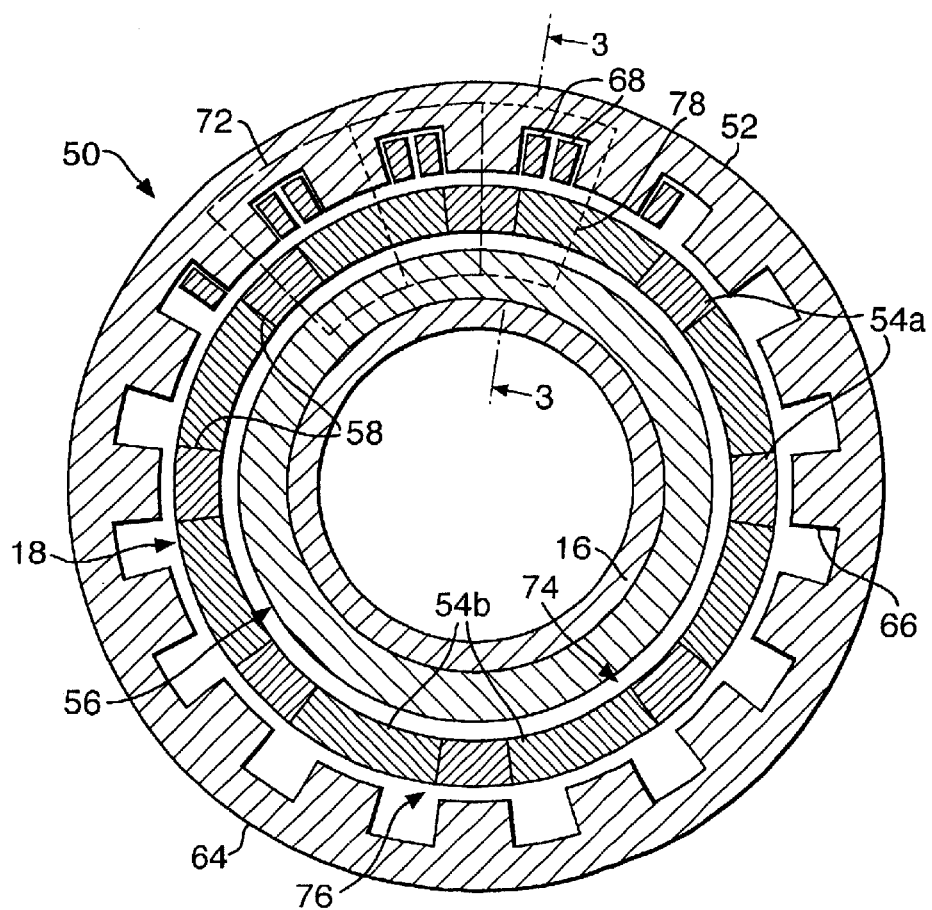
FIG. 2 is a cross-section of a shaft arrangement in accordance with the present invention, taken through the bearing arrangement of the shaft arrangement.

FIG. 2 illustrates an arrangement in accordance with the present invention. The arrangement 50 has an inner rotatable shaft, which is the shaft 16 in this example, located within an outer shaft, which is the shaft 18 in this example. Consequently, as has been described, the shaft 18 is hollow. Both shafts 16, 18 are rotatable. A bearing arrangement for controlling the alignment of the shaft 16 has an electrical stator 52 which is outside the shaft 18 and is operable during use, as will be described, to generate magnetic flux which extends through the shaft 18 to interact with the shaft 16 to control the alignment of the shaft 16. This is achieved by providing the shaft 18 with a circumferential ring of regions 54a, 54b alternately of relatively high and relatively low magnetic permeability. The ring of regions 54 is located between the stator 52 and the shaft 16 so that flux is transmitted between the stator 52 and the shaft 16 through the regions 54 and is transmitted preferentially through the high permeability regions 54a.

In this, and other examples to be described, the high permeability material may, for example, be a cobalt-iron alloy, which may have a relative permeability of 1000 to 5000. In principle, the relative permeability is preferred to be as high as possible, subject to other constraints such as saturation flux density. The low permeability material may be a steel, such as an austeritic steel (18/8 or 18/2 stainless steel), having a relative permeability of approximately unity.

Figure 3:
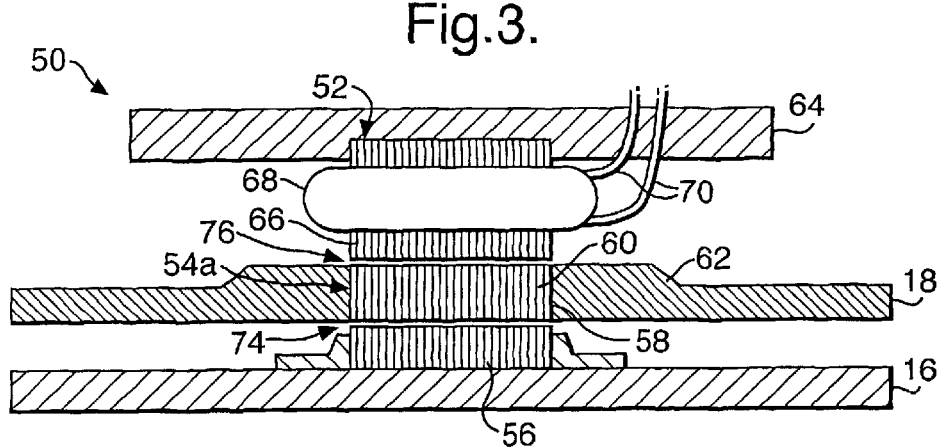
FIG. 3 is a section of the arrangement of FIG. 2, viewed along the line 3—3 in FIG. 2.

The structure and operation of the arrangement 50 can be described in more detail by reference also to FIG. 3. The shaft 16 is innermost in the arrangement and carries a circumferential collar 56 of soft magnetic material, preferably with a high saturation flux density, such as a cobalt-iron alloy. Examples of suitable alloys are Hiperco 50 HS and Rotelloy 8, both available from Carpenter Technology (UK) Limited. The collar 56 is preferably laminated to reduce eddy current losses when the collar 56 interacts with magnetic flux created by the stator 52.

The shaft 18 is formed of an appropriate material for meeting its mechanical requirements, such as a steel. Many materials appropriate for mechanical reasons, such as steel, will have a relatively low magnetic permeability. In the region of the collar 56, a circumferential ring of slots 58 is formed around the shaft 18. These slots 58 are filled with soft magnetic material, which may be one of the materials set out above and is preferably laminated for reaction of eddy current losses. The material preferably has a high saturation flux density to maximise the ability of the insert to carry magnetic flux. In this example, the ring has eight inserts 60.

The shaft 18 may be locally strengthened at 62 by increased thickness, to compensate for any weakness introduced by the presence of the slots 58 and inserts 60. The shape of the slots is preferably chosen to avoid undue stress concentration when the shaft 18 is experiencing operational torque.

The stator 52 is a ring 64 of soft magnetic material surrounding the shaft 18 and from which a ring of pole pieces 66 project inwardly, toward the shaft 18. In this example, the stator 52 is shown as having sixteen pole pieces 66, i.e. twice as many pole pieces 66 as there are inserts 60, so that the angular separation of the inserts 60 is twice the angular separation of the pole pieces 66. However, the invention is not restricted to this number or ratio of numbers.

Each pole piece 66 is laminated against eddy current losses and is surrounded by a winding 68 which can be energised through connecting wires 70 to allow the corresponding pole piece 66 to be energised.

In the absence of the shaft 18, the stator 52 could be used to form an active magnetic bearing with the shaft 16 by energising the pole pieces 66 to create magnetic flux flowing through the ring 64, pole pieces 66 and the collar 56, crossing the gap between the collar 56 and the pole pieces 66. However, the arrangements must take into account the interposition of the shaft 18. As has been noted, the permeability of the regions 54 alternates around the shaft 18. Consequently, when the shafts 16, 18 and stator 52 are instantaneously aligned as illustrated in FIG. 2, it can be seen that a closed flux path 72 is available through two of the pole pieces and the inserts 60 which are aligned with them. In view of the high permeability of the stator 52, inserts 60 and collar 56, significant flux density can be created around the path 72 without requiring excessive currents in the windings 68. The path 72 is formed almost entirely in high permeability material, except for gaps 74 between the shafts 16, 18 and gaps 76 between the shaft 18 and the stator 52. Any tendency of flux to form a path through the shaft 18, without passing through to interact with the collar 56, is resisted by the low permeability of the shaft material 18, i.e. the low permeability of the region 54b between those regions 54a which are contributing to the path 72.

In effect, the inserts 60 form "windows" through the shaft 18, through which the magnetic flux from the stator 52 is preferentially transmitted for interaction with the shaft 16. Having achieved good magnetic connection between the stator 52 and the shaft 16, control of the alignment of the shaft 16 can be achieved by controlling the excitation of the stator windings 68 in a manner analogous to control techniques used within conventional active magnetic bearings which have no outer shaft interposed between the stator and the shaft being controlled. These techniques are known in themselves. Briefly, they involve changing the magnitude of the magnetic fields in order to pull or push the shaft into alignment.

As the shafts 16, 18 continue to turn, the inserts 60 will move out of alignment with the pole pieces 66, so that the path 72 will break down. Upon further rotation, the inserts 60 will come into alignment with the next pole pieces 66 around the stator 52. Consequently, energisation of hose next pole pieces 66 will allow an alternative path 78 to be formed, analogous to the path 72 but further advanced around the stator 52.

Consequently, the inserts 60 will be repeatedly coming into and out of alignment with the pole pieces 66 as the shaft 18 rotates. In some circumstances, it may be sufficient to maintain constant energisation of the stator 52, so that the shaft 16 experiences intermittent magnetic interaction each time inserts 60 align with pole pieces 66. However, this will result in varying torque being applied to the shaft 18 as magnetic paths are formed and broken and it is believed that in many situations, the resulting torque ripple on the shaft 18 will be undesirable.

It is therefore preferred to provide commutation for the energisation of the pole pieces 66, so that the pole pieces 66 are energised sequentially and at a rate which causes a rotating magnetic field to be created, synchronous with the rotation of the shaft 18. Since the rotating field is synchronous with the shaft 18, the field will rotate with the inserts 60 and consequently, good magnetic interaction with the collar 56 can be maintained, with torque effects on the shaft 18 being substantially reduced or eliminated.

Figure 4:
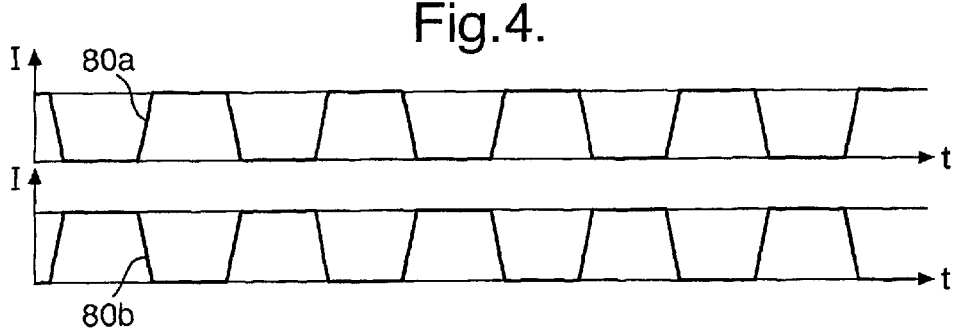
FIG. 4 is a timing diagram representing waveforms applied to the energising windings of the arrangement of FIG. 2.

FIG. 4 illustrates two waveforms for current (I) against time (t) for excitation of pole pieces 66 in the arrangement of FIG. 2. The upper current waveform 80a is applied to alternate pole pieces 66 to create a path such as the path 72 in FIG. 2. The current waveform 80b is applied to the remaining pole pieces 66 to create paths such as the path 78. As can readily be seen and will be understood from the above description, the creation of paths 72 will alternate with the creation of paths 78, so that the waveforms 80a, 80b are inverted with respect to each other. The waveforms 80 are applied around the stator 52 to create a series of paths 72, alternating in time with a series of paths 78.

The waveforms 80 are shown in FIG. 4 as having constant amplitude. This corresponds with the situation in which the shaft 16 is correctly aligned. In practice, a control waveform would be superimposed on the waveform 80, modulating the amplitude, to correct any misalignment of the shaft 16. It will be necessary to monitor the position of the axis of the shaft 16 in order to create the control waveforms which may be created by pulse width modulation (PWM) or linear techniques, known in themselves. Monitoring the radial position of the shaft 16 may be possible by monitoring the back EMF on the windings 68, because movement of the shaft 16 toward or away from the stator 52 will change the overall length of the flux paths 72, 78. This will result in a change in the back EMF. However, it is to be noted that any change in alignment of the shaft 18 will leave the effective path length substantially unaffected, since any increase or decrease in the gap 76 will be accompanied by a corresponding decrease or increase in the gap 74. The total length of the gap between high permeability material will therefore be unaffected, although it is realised that the effects may not be wholly linear, depending to some extent on the relative sizes of the gaps 74, 76. However, any change in back EMF arising from misalignment of the shaft 18 is expected to be a negligible or secondary effect, as compared with the effect of misalignment of the shaft 16. Alternatively, capacitive sensors, or other sensors, could be used.

Commutation has been described above as providing a magnetic field which rotates at a rate synchronous with the shaft 18. It is envisaged that phase lead or lag between the rotating magnetic field and the inserts 60 could be deliberately introduced by appropriate control of the winding excitation, in order to create a motor or generator effect in addition to the bearing effect described above, and in the manner of a switched reluctance electrical machine.

In the example of FIG. 2, the eight inserts 60 will all come into alignment with a pole piece 66 at the same time and will then all move out of alignment until rotating into alignment with the neighbouring pole pieces. This may result in some undesirable lack of smoothness in the bearing function. It is envisaged that other arrangements may be helpful in this respect. For example, an increase in the number of pole pieces 66 would reduce the time required for an insert 60 to move from one pole piece 66 to the next. Further, the use of a number of pole pieces and inserts which are not in simple mathematical relation (the one being twice the other, in this example) can be expected to produce an arrangement in which, at all times, a small number of inserts 60 are in alignment with pole pieces 66, those aligned inserts being distributed around the stator 52, so that magnetic forces applied to the collar 56 are less strong (because fewer pole pieces are contributing at any moment in time) but are smoother.

Figure 5:
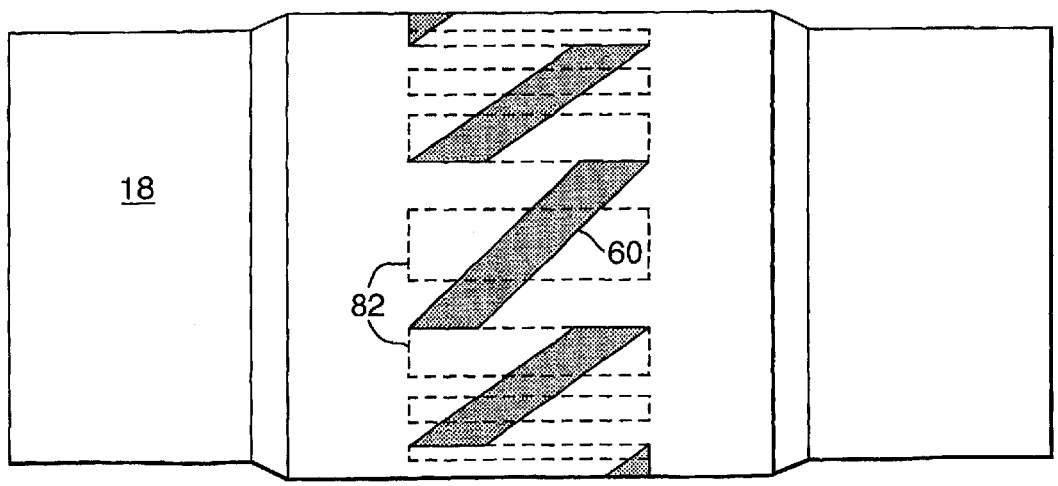
FIG. 5 is a schematic view of the outer surface of the outer shaft of the arrangement of FIG. 2.

Further smoothness in the performance of the bearing function can be achieved in the manner illustrated schematically in FIG. 5. In this example, the inserts 60 are in an alignment which is skewed relative to the central axis of the shaft 18. Consequently, the boundary between regions of high and low permeability is skewed. Broken lines 82 are superimposed on FIG. 5 to illustrate the location of the pole pieces 66, from which it can be seen that by appropriate arrangement of the geometry, i.e. the length and degree of skew of the inserts 60, one end of a pole piece 66 will be moving into alignment with the next insert 60, before the other end of the same pole piece 66 moves fully clear of the preceding insert 60, so that smoother transfer of flux from one insert to the next can be achieved.

The example described above, primarily in relation to FIG. 2, uses flux paths 72, 78 which extend radially from pole pieces 66, through inserts 60 to the collar 56, and extend circumferentially (i.e. transverse to the axis) through the collar 56 and stator 52.

Figure 6:
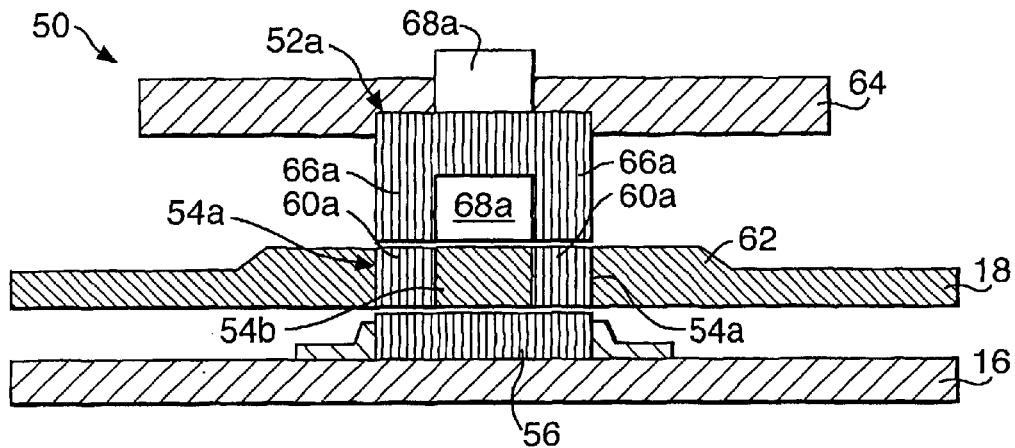
FIG. 6 corresponds with FIG. 3, showing an alternative magnetic field geometry.

FIG. 6 illustrates an alternative arrangement in which the magnetic "windows" through the shaft 18 are formed by pairs of inserts 60a. In addition, the stator winding 68a is turned through one quarter turn relative to the winding of FIG. 3, and the pole piece 66a is provided with two end faces opposing respective inserts 60a. Consequently, this arrangement provides closed flux paths which pass radially from the stator to the shaft 16, at radial positions which are spaced along the shaft, the path being completed by legs parallel to the rotation axis, through the stator 52a and collar 56.

Figure 7:
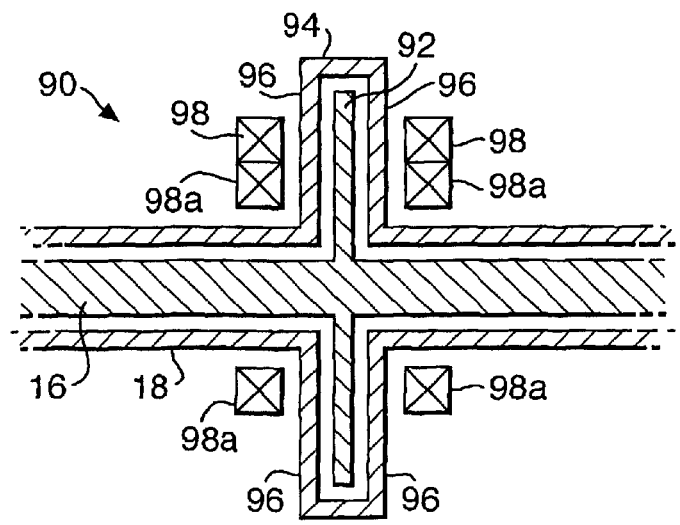
FIG. 7 represents, highly schematically, the application of the invention in the formation of a thrust bearing.

A further example of a practical implementation of the invention is illustrated, highly schematically, in FIG. 7. FIG. 7 illustrates an arrangement which can be used as a thrust bearing 90. In this case, the shaft 16 carries a circumferential flange 92 which is received within a toroidal channel 94 in the shaft 18 and is of high permeability material. The planar surfaces 96 of the channel 94 are provided with rings of inserts (not shown) to provide magnetic "windows" in the manner described above in relation to the inserts 60. Stator arrangements 98 are provided outside the channel 94. Consequently, the stator arrangements 98 can be excited to apply control forces to the flange 92 through the magnetic windows in the surfaces 96. These forces will be axial on the shaft 16, thus allowing axial thrust to be applied to the shaft 16. Commutation may be used, to reduce or eliminate torque ripple arising from the thrust bearing arrangements.

Additional stator arrangements 98a may be optionally included in the arrangement of FIG. 7, to allow the arrangement to be used as a combination bearing, providing thrust and axial alignment control to the shaft 16. The stator arrangements 98a can be of the type described above in relation to FIGS. 1 to 6, there being magnetic windows in the circumferential wall of the shaft 18, to allow the arrangements 98a to interact with the shaft 16 in the manner described above.

Consequently, it can be understood that the arrangements which have been described can be used to provide thrust control, axial alignment control, or both.

Many variations and modifications can be made to the apparatus described above. In addition to the application in gas turbine engines, as specifically discussed, it is envisaged that the arrangements can be used elsewhere, where the inner shaft of an inner and outer shaft arrangement is to be controlled.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A shaft arrangement having an inner rotatable shaft and an outer rotatable shaft wherein the outer rotatable shaft is hollow, the inner rotatable shaft is located within the outer rotatable shaft, there being a bearing arrangement for controlling the alignment of the inner shaft, the bearing arrangement having an electrical stator means outside the outer shaft and operable, in use, to generate magnetic flux which extends through the outer shaft to interact with the inner shaft to control the alignment of the inner shaft, wherein the outer shaft has a circumferential ring of regions alternately of relatively high and relatively low magnetic permeability, the ring being located between the stator means and the inner shaft so that flux is transmitted between the stator means and inner shaft through the ring regions and is transmitted preferentially through the high permeability regions.

2. An arrangement according to claim 1, wherein the stator means includes a ring of pole pieces and energising means operable to energise the pole pieces to create a magnetic field, the energising means being operable to commutate the magnetic field as the outer shaft rotates.

3. An arrangement according to claim 2, wherein the commutation causes the magnetic field to rotate at substantially the same rate as the outer shaft, whereby flux through the high permeability regions is substantially maintained as the outer shaft rotates.

4. An arrangement according to claim 2, wherein the energising means is operable to produce a commutating waveform for energising the pole pieces in commutated manner, and is further operable to superimpose a control waveform on the commutating waveform, the control waveform serving to create a variable force on the inner shaft, to control the alignment of the inner shaft.

5. An arrangement according to claim 1 wherein the stator means and the high permeability regions cooperate to form flux paths which pass substantially radially from the stator means to the inner shaft along radii which are circumferentially spaced around the shaft, and pass substantially circumferentially around the inner shaft, between the two radial positions.

6. An arrangement according to claim 5 wherein the alignment of the region boundaries is skewed relative to the axis of the inner shaft.

7. An arrangement according to claim 1, wherein the stator means and high permeability regions cooperate to form flux paths which pass substantially radially from the stator means to the inner shaft along radii which are spaced axially along the shaft, and pass substantially axially along the inner shaft, between the two radial positions.

8. An arrangement according to claim 1 wherein the ring of regions is created by forming a ring of slots in the material of the outer shaft, and locating inserts in the slots, the material of the inserts and the material of the shaft being of different permeability.

9. An arrangement according to claim 1 wherein the stator means and ring are arranged to allow a transverse force to be applied to the inner shaft.

10. An arrangement according to claim 1 wherein the stator means and ring are arranged to allow an axial force to be applied to the inner shaft.

11. A gas turbine engine comprising a shaft arrangement as claimed in claim 1.

12. An engine according to claim 11, wherein at least the inner rotatable shaft is a load transmitting shaft interconnecting a fan or compressor and a turbine assembly of the engine.

* * * * *